(12) United States Patent
Meadors

(10) Patent No.: US 8,217,892 B2
(45) Date of Patent: Jul. 10, 2012

(54) TACTILE FEEDBACK INPUT DEVICE

(75) Inventor: Michael J. Meadors, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 864 days.

(21) Appl. No.: 12/115,999

(22) Filed: May 6, 2008

(65) Prior Publication Data
US 2009/0278671 A1 Nov. 12, 2009

(51) Int. Cl.
*G09G 5/00* (2006.01)

(52) U.S. Cl. ...................... 345/156; 340/407.2

(58) Field of Classification Search .................. 345/156; 463/30–38; 74/84; 251/297
See application file for complete search history.

(56) References Cited

U.S. PATENT DOCUMENTS

| | | | |
|---|---|---|---|
| 6,104,382 A | 8/2000 | Martin et al. | |
| 6,219,034 B1 | 4/2001 | Elbing et al. | |
| 6,422,941 B1 | 7/2002 | Thorner et al. | |
| 6,531,998 B1 * | 3/2003 | Gordon | 345/156 |
| 7,061,466 B1 | 6/2006 | Moore et al. | |
| 7,182,691 B1 * | 2/2007 | Schena | 463/38 |
| 7,328,883 B2 * | 2/2008 | Marcoux et al. | 251/297 |
| 2006/0005644 A1 * | 1/2006 | Weaver | 74/84 S |
| 2006/0290662 A1 * | 12/2006 | Houston et al. | 345/156 |

* cited by examiner

*Primary Examiner* — Nitin Patel
*Assistant Examiner* — Towfiq Elahi
(74) *Attorney, Agent, or Firm* — Haynes and Boone, LLP

(57) ABSTRACT

An input device includes an input device chassis. At least one tactile feedback module is coupled to the input device chassis. The tactile feedback module includes a first electromagnet and a second electromagnet located in a spaced apart relationship from the first electromagnet. A mass includes a pair of opposing ends and is located between the first electromagnet and the second electromagnet. A permanent magnet is located on each of the opposing ends of the mass. The mass is operable to move along an axis between the first electromagnet and the second electromagnet and may be moved to produce a variety of forces on the input device in order to provide tactile feedback.

23 Claims, 13 Drawing Sheets

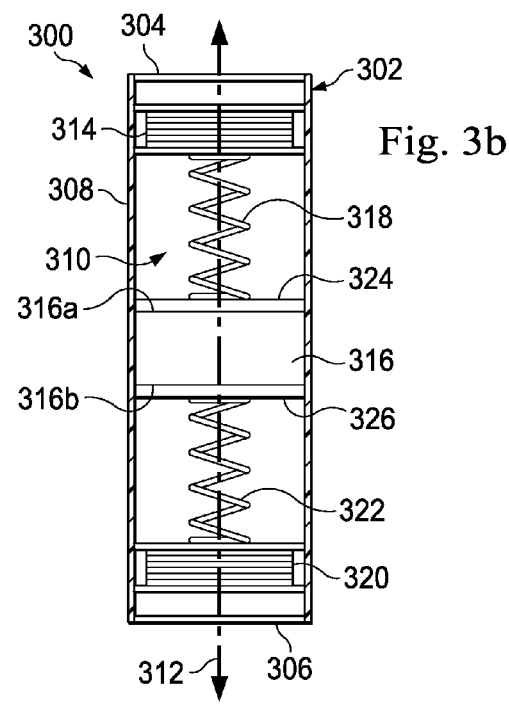
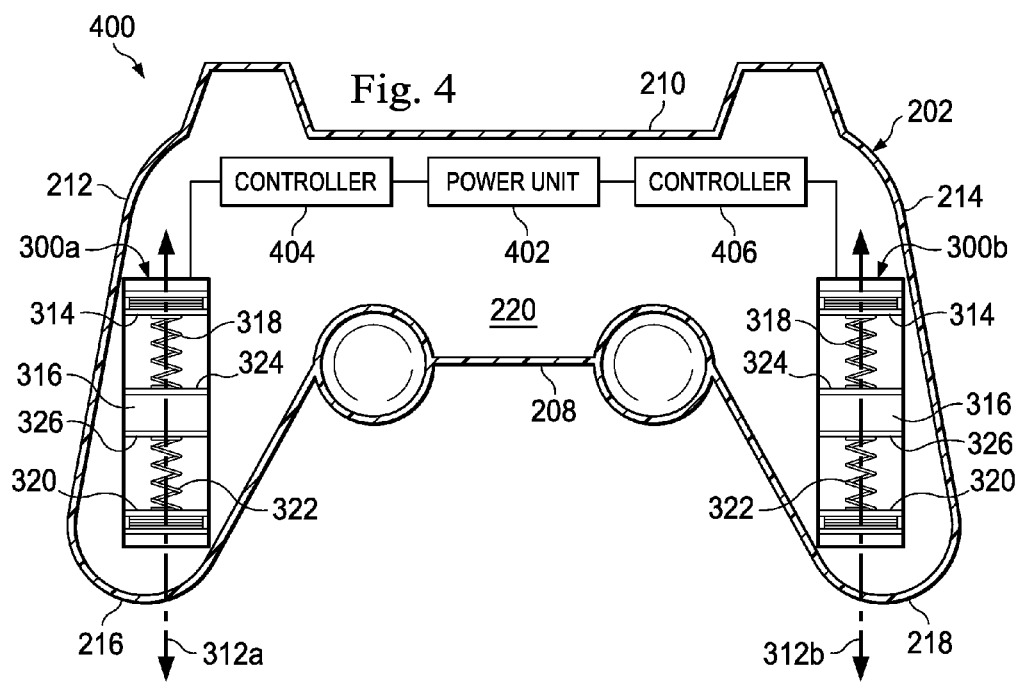

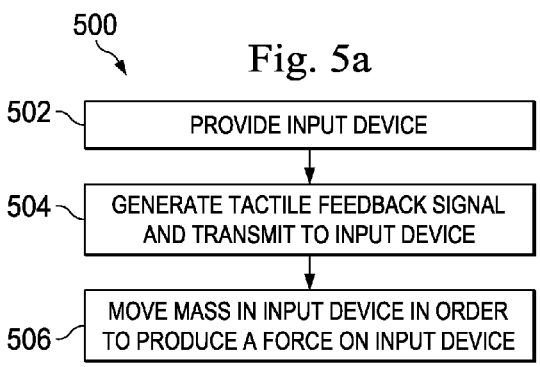
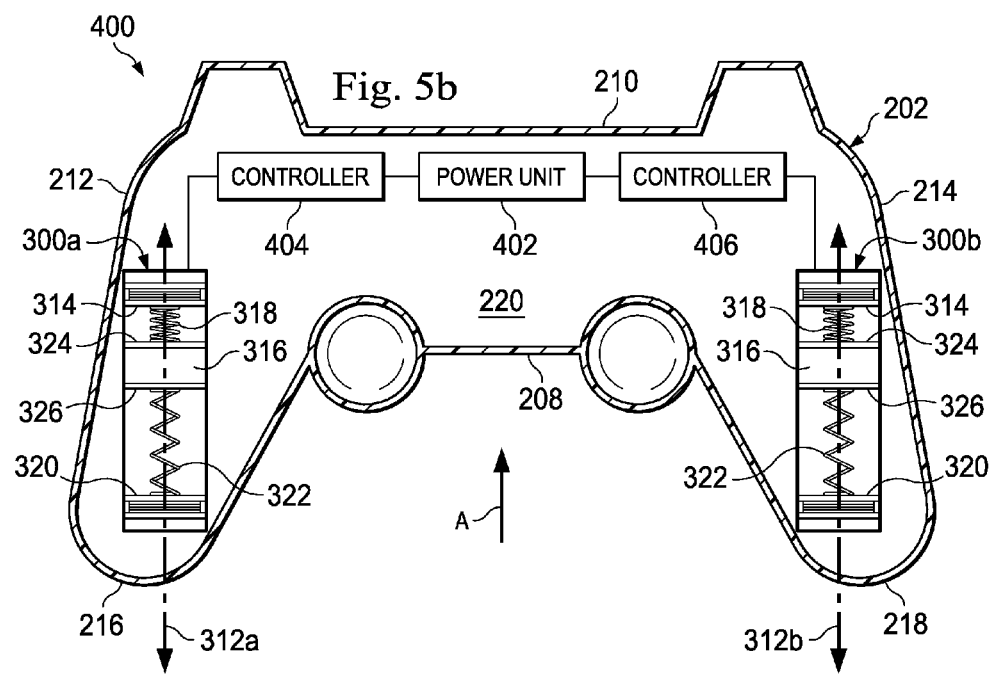

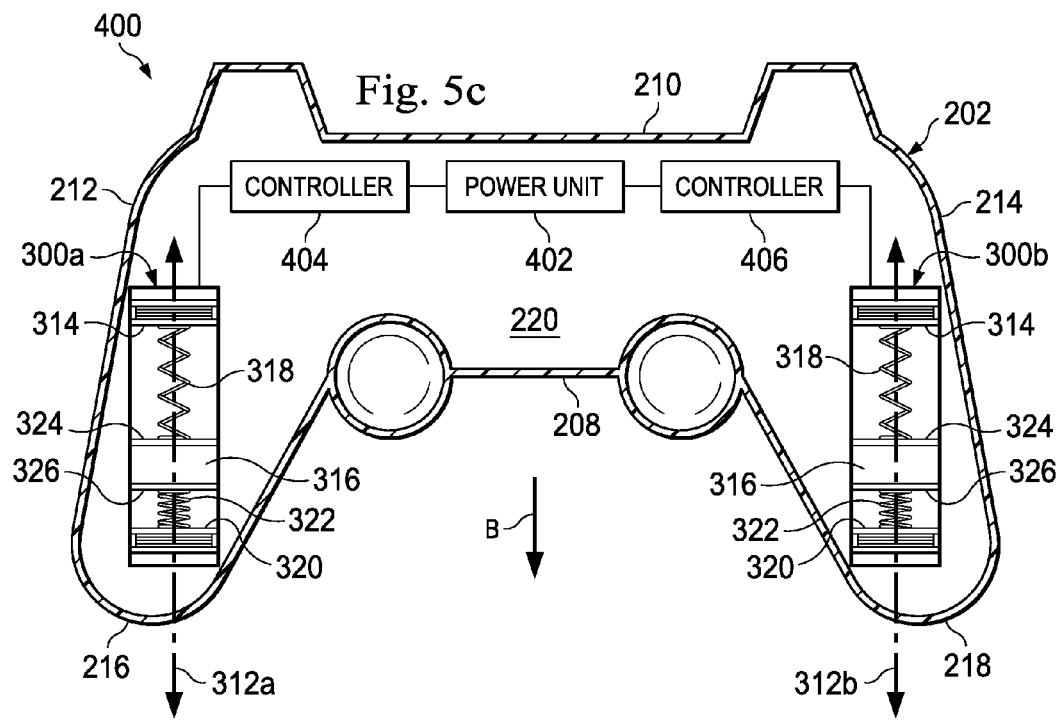
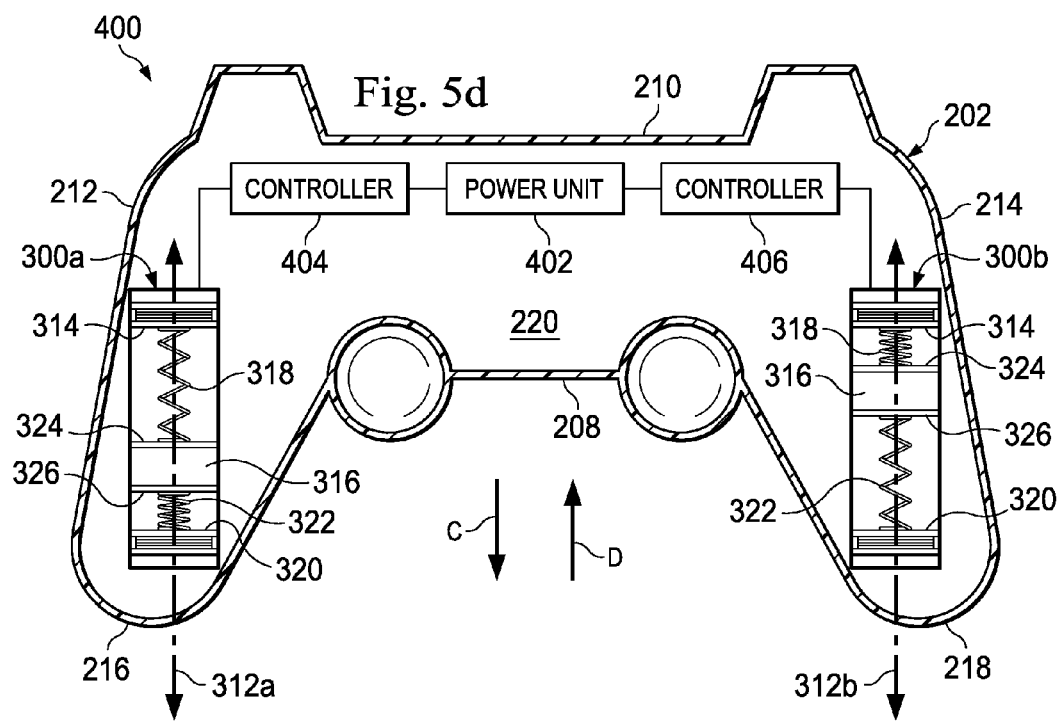

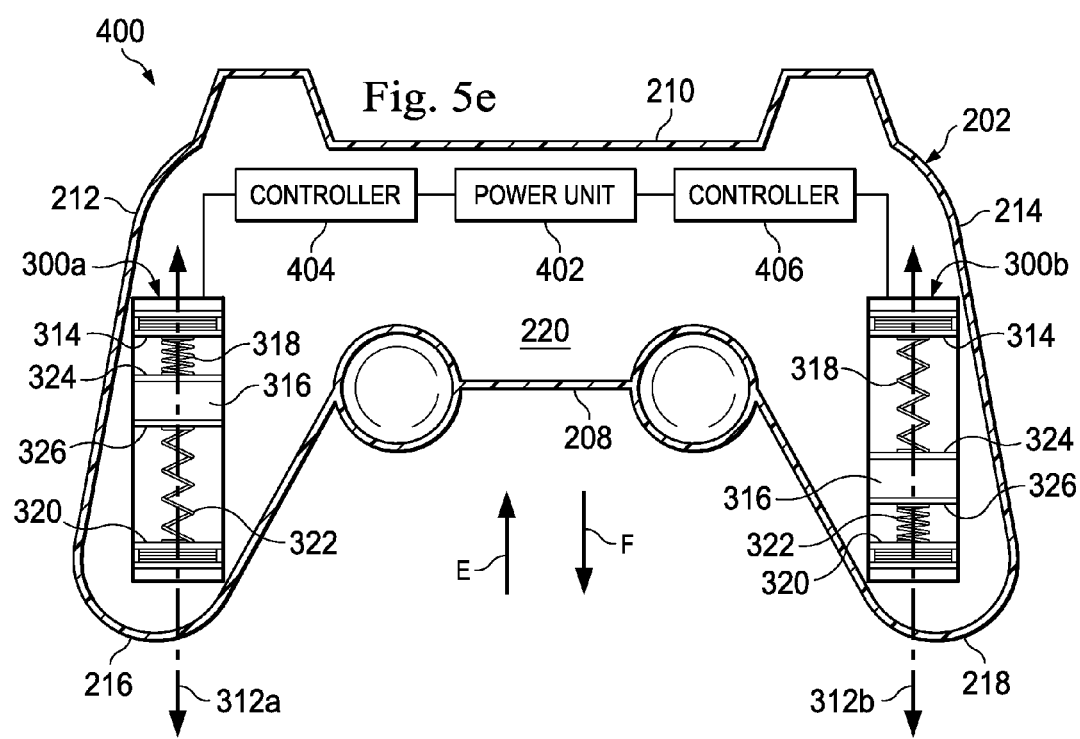

TACTILE FEEDBACK INPUT DEVICE

BACKGROUND

The present disclosure relates generally to information handling systems, and more particularly to a tactile feedback input device for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, those used in game applications, include input devices/controllers in order to provide input to the IHS. In some situations, it is desirable to provide tactile feedback to the user of the input device to, for example, enhance the experience of using a game application. The provision of tactile feedback to the user of the input device raises a number of issues.

Conventional solutions for providing tactile feedback to a user of an input device typically utilize a simple vibration device that is located in the input device and includes a motor having a shaft with an offset weight mounted to the shaft. Upon operation of the motor, the offset weigh induces a vibration in the input device. Thus, for any action occurring in the game application for which tactile feedback is desired, the only variation in the tactile feedback is the frequency of vibration of the input device. Furthermore, continued vibrations that may be experienced during prolonged use of the input device can be uncomfortable for the user.

Accordingly, it would be desirable to provide an improved input device with tactile feedback absent the disadvantages discussed above.

SUMMARY

According to one embodiment, an input device includes an input device chassis and at least one tactile feedback module coupled to the input device chassis, the at least one tactile feedback module including a first electromagnet and a second electromagnet located in a spaced apart relationship from the first electromagnet, and a mass comprising a pair of opposing ends and located between the first electromagnet and the second electromagnet, wherein a permanent magnet is located on each of the opposing ends of the mass, and wherein the mass is operable to move along an axis between the first electromagnet and the second electromagnet.

BRIEF DESCRIPTION OF THE DRAWINGS

FIG. 2b is a rear view illustrating an embodiment of the input device chassis of FIG. 2a.

FIG. 2c is a cut away top view illustrating an embodiment of the input device chassis of FIG. 2a.

FIG. 3b is a cut away side view illustrating an embodiment of the tactile feedback module of FIG. 3a.

FIG. 4 is a cut away top view illustrating an embodiment of a tactile feedback input device including the input device chassis of FIGS. 2a, 2b and 2c, and a plurality of the tactile feedback modules of FIGS. 3a and 3b.

FIG. 5a is a flow chart illustrating an embodiment of a method for providing tactile feedback for an input device.

FIG. 5b is a cut away top view illustrating an embodiment of the tactile feedback input device of FIG. 4 with a plurality of the tactile feedback modules of FIGS. 3a and 3b being operated to produce a force on the tactile feedback input device.

FIG. 5c is a cut away top view illustrating an embodiment of the tactile feedback input device of FIG. 4 with a plurality of the tactile feedback modules of FIGS. 3a and 3b being operated to produce a force on the tactile feedback input device.

FIG. 5d is a cut away top view illustrating an embodiment of the tactile feedback input device of FIG. 4 with a plurality of the tactile feedback modules of FIGS. 3a and 3b being operated to produce a force on the tactile feedback input device.

FIG. 5e is a cut away top view illustrating an embodiment of the tactile feedback input device of FIG. 4 with a plurality of the tactile feedback modules of FIGS. 3a and 3b being operated to produce a force on the tactile feedback input device.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
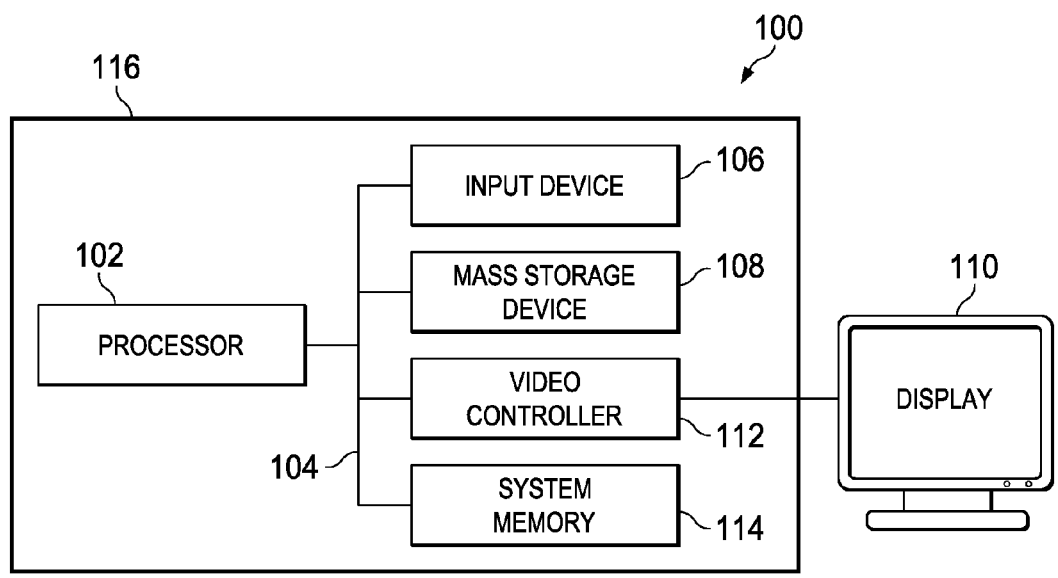
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102. In an embodiment, the IHS 100 may be a general purpose system, a dedicated gaming system, and/or a variety of other IHSs known in the art.

Figure 2A:
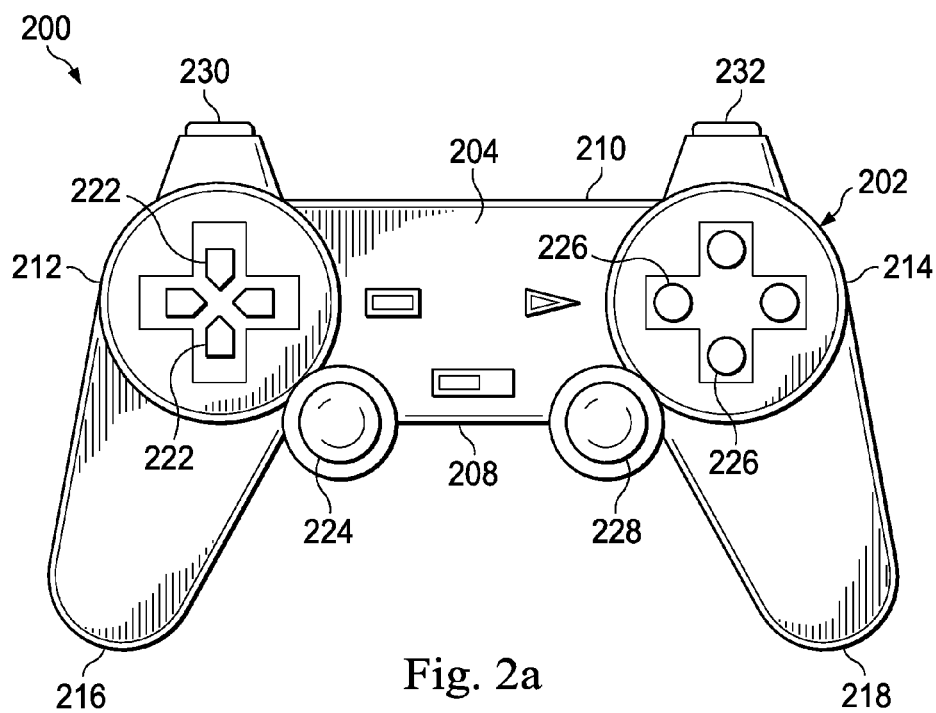
FIG. 2a is a top view illustrating an embodiment of an input device chassis.
Figure 2B:
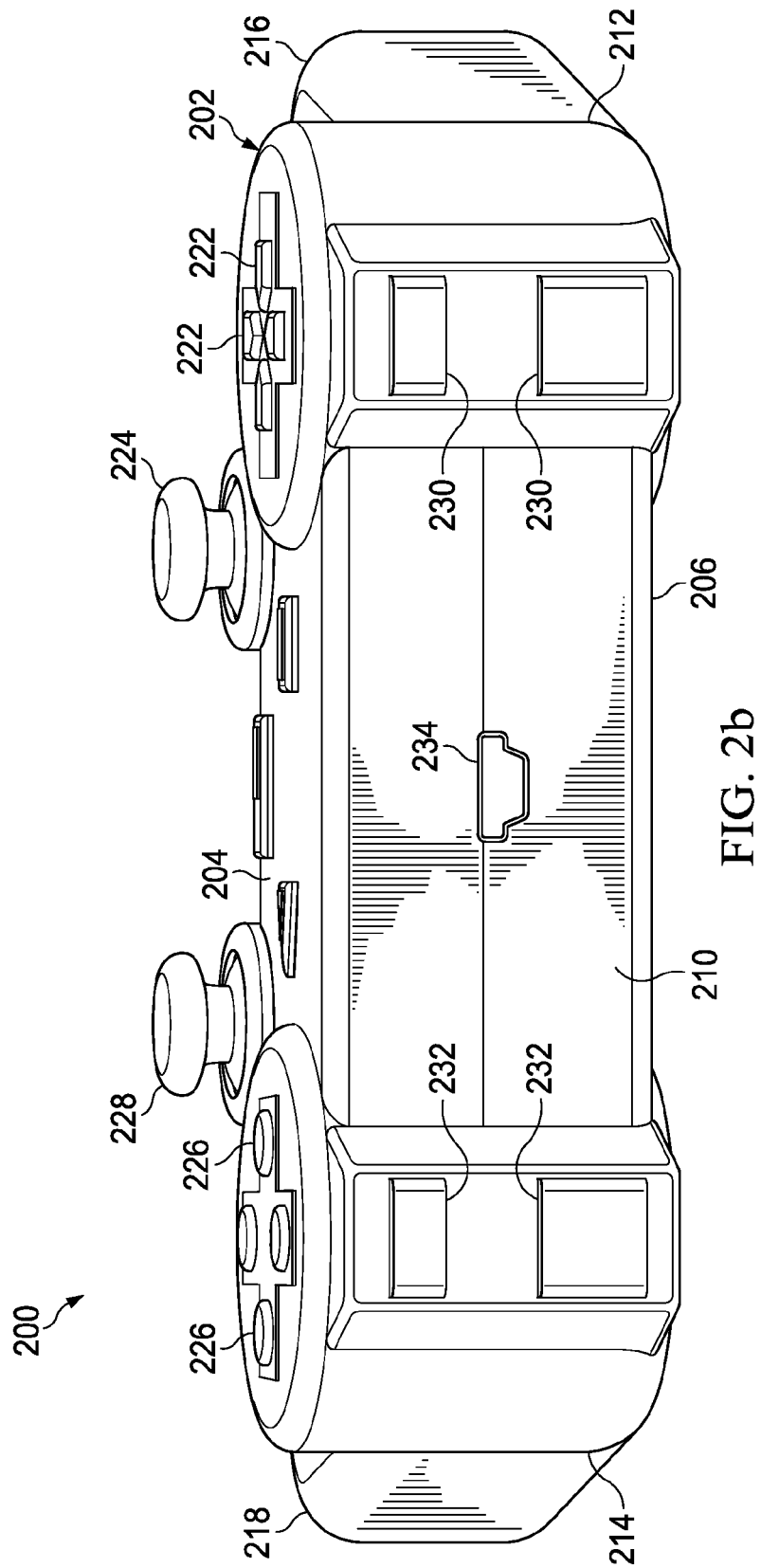
Figure 2C:
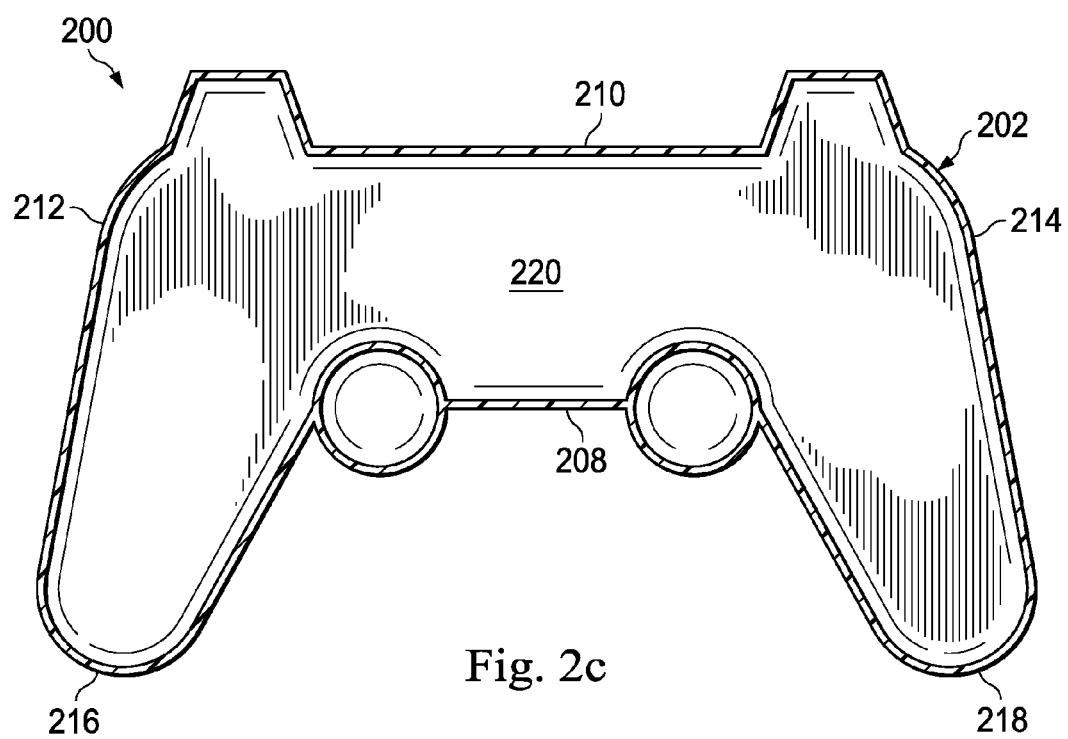

Referring now to FIGS. 2a, 2b and 2c, an input device 200 is illustrated. The input device 200 includes an input device chassis 202 having a top surface 204, a bottom surface 206 located opposite the top surface 204, a front surface 208 extending between the top surface 204 and the bottom surface 206, a rear surface 210 located opposite the front surface 208 and extending between the top surface 204 and the bottom surface 206, and a pair of opposing side surface 212 and 214 extending between the top surface 204, the bottom surface 206, the front surface 208, and the rear surface 210. A pair of handles 216 and 218 extend from opposite ends of the input device chassis 202, with the handle 216 located adjacent the side surface 212 and the handle 218 located adjacent the side surface 214. An input device chassis housing 220 is defined between the top surface 204, the bottom surface 206, the front surface 208, the rear surface 210, and the side surface 212 and 214, and within the handles 216 and 218, as illustrated in FIG. 2c. A plurality of input buttons 222 and an input stick 224 are located on the top surface 204 of the input device 200 and adjacent the handle 216. A plurality of input buttons 226 and an input stick 228 are located on the top surface 204 of the input device 200 and adjacent the handle 218. A plurality of input buttons 230 are located on the rear surface 210 of the input device 200 adjacent the side surface 212, and a plurality of input buttons 232 are located on the rear surface 210 of the input device 200 adjacent the side surface 214. One of skill in the art will recognize that input buttons, input sticks, and/or other devices may be added on and/or removed from the input device 200 while remaining within the scope of the present disclosure. A connector 234 is located on the rear surface 210 of the input device 200 between the input buttons 230 and 232. In an embodiment, a plurality of conventional components are housed in the input device chassis housing 220 to provide functionality for the input device 200, but have been omitted for clarity.

Figure 3A:
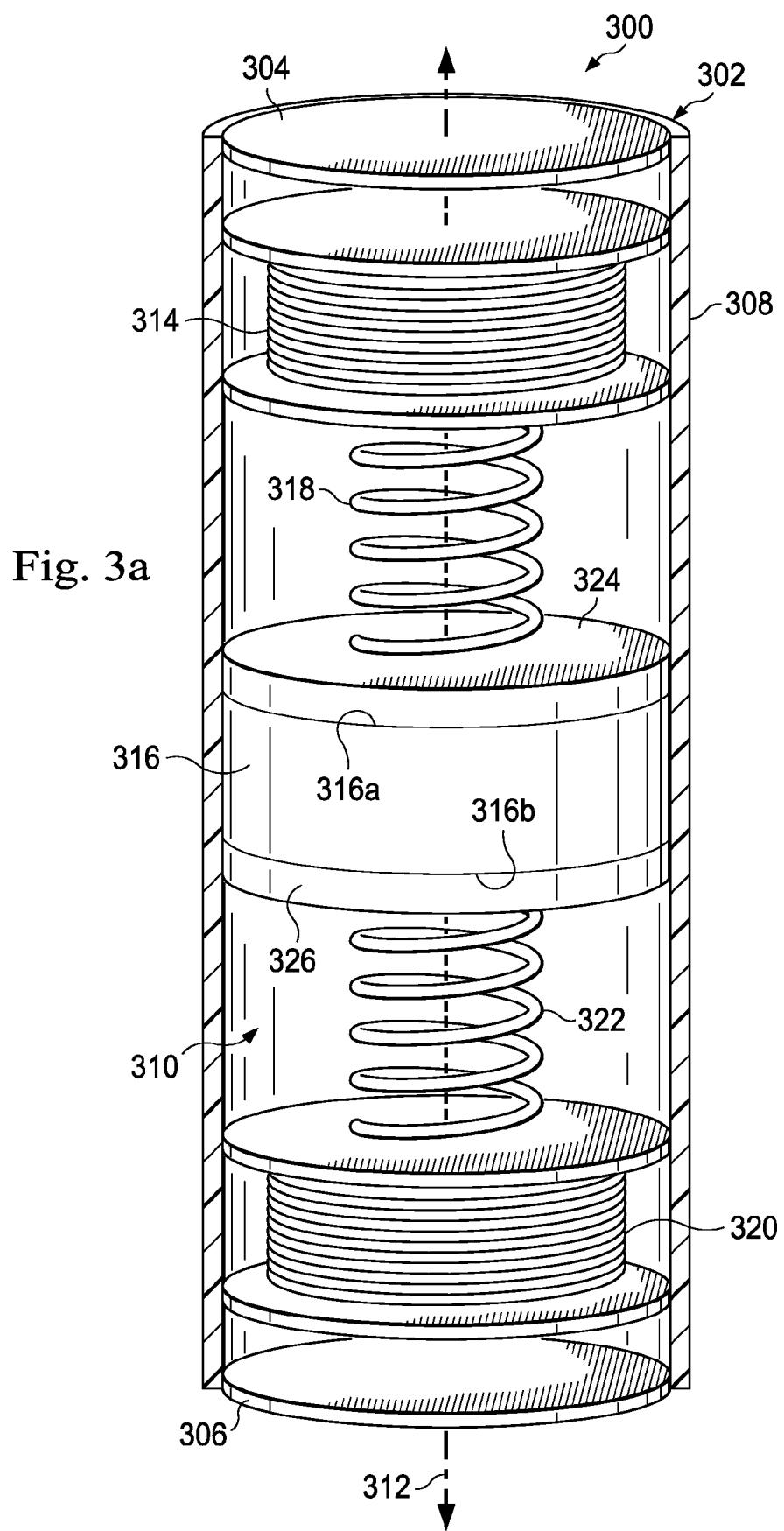
FIG. 3a is a cut away perspective view illustrating an embodiment of a tactile feedback module used in the input device chassis of FIGS. 2a, 2b and 2c.

Referring now to FIGS. 3a and 3b, a tactile feedback module 300 is illustrated. The tactile feedback module 300 includes a cylindrical feedback module chassis 302 having a top wall 304, a bottom wall 306 located opposite the top wall 304, and a side wall 308 extending between the top wall 304 and the bottom wall 306. A feedback module chassis housing 310 is defined by the feedback module chassis 302 and located between the top wall 304, the bottom wall 306, and the side wall 308. The feedback module chassis 302 includes an axis 312 that, in the illustrated embodiment, extends through the center of the cylindrical feedback module chassis 302 and along its length. A first actuator 314 is located in the feedback module chassis housing 310 adjacent the top wall 304 of the feedback module chassis 302. In an embodiment, the first actuator 314 is an electromagnet. A mass 316 is coupled to the first actuator 314 by a first resilient member 318. A second actuator 320 is located in the feedback module chassis housing 310 adjacent the bottom wall 306 of the feedback module chassis 302, and the mass 316 is coupled to the second actuator 320 by a second resilient member 322. In the illustrated embodiment, the mass 316 includes a pair of opposing sides 316a and 316b, with a first permanent magnet 324 located on the side 316a of the mass 316 such that it is facing the first actuator 314 and a second permanent magnet 326 located on the side 316b of the mass 316 such that it is facing the second actuator 320.

Referring now to FIGS. 2c, 3b and 4, an embodiment of a tactile feedback input device 400 is illustrated. In an embodiment, the tactile feedback input device 400 may be the input device 106 coupled to the IHS 100, described above with reference to FIG. 1. In the illustrated embodiment, a plurality of tactile feedback modules 300a and 300b, which are substantially similar in structure and operation to the tactile feedback module 300 described above with reference to FIGS. 3a and 3b, are located in the input device chassis housing 220 with the tactile feedback module 300a located in the portion of the input device chassis housing 220 defined by the handle 216 and the tactile feedback module 300b located in the portion of the input device chassis housing 220 defined by the handle 218. The tactile feedback module 300a includes an axis 312a that is substantially similar to the axis 312 described above with reference to FIGS. 3a and 3b, and the tactile feedback module 300b includes an axis 312b that is substantially similar to the axis 312 described above with reference to FIGS. 3a and 3b. In the illustrated embodiment, the axis 312a of the tactile feedback module 300a is parallel to the axis 312b of the tactile feedback module 300b. A power unit 402 is located in the input device chassis housing 220. In an embodiment, the power unit 402 is coupled to the connector 234 located on the rear surface 210 of the input device chassis 202 such that the power unit 402 may be coupled to a power supply that is external to the tactile feedback input device 400. For example, a cable may be coupled to the connector 234 and an IHS such as, for example, the IHS 100 described above with reference to FIG. 1, in order to couple the tactile feedback input device 400 to the IHS 100. In an embodiment, the cable may include a Universal Serial Bus (USB) connector that is coupled to a compatible connector on the IHS 100. In an embodiment, the power unit 402 includes a power supply located in the input device chassis housing 220 such as, for example, a battery. A controller 404 is coupled between the power unit 402 and the tactile feedback module 300a and a controller 406 is coupled between the power unit 402 and the tactile feedback module 300b. Each of controllers 404 and 406 may be coupled to the connector 234 located on the rear surface 210 of the input device chassis 202 such that the controllers 404 and 406 may be coupled to, for example, the processor 102 in the IHS 100, described above with reference to FIG. 1. In an embodiment, the controllers 404 and 406 may be wirelessly coupled to the IHS 100. In an embodiment, the controller 404 may include, for example, a separate controller coupled to each of the first actuator 314 and the second actuator 320 on the tactile feedback module 300a. In an embodiment, the controller 406 may include, for example, a separate controller coupled to each of the first actuator 314 and the second actuator 320 on the tactile feedback module 300b. In an embodiment, the controllers 404 and 406 and/or the power unit 402 may include power storage devices, power amplification devices, and/or a variety of other devices known in the art that may be used to provide power to the tactile feedback modules 300a and 300b. For example, a capacitive charge pump that feeds into a current amplifier may be coupled to each of the first actuator 314 and the second actuator 320 on the tactile feedback modules 300a and 300b in order to provide enough power to operate those and other components of the tactile feedback input device 400.

Referring now to FIGS. 1, 4 and 5a, a method 500 for providing tactile feedback for an input device is illustrated. The method 500 begins at block 502 where the tactile feedback input device 400 is provided. In an embodiment, the tactile feedback input device 400 is coupled to the IHS 100 by, for example, a cable, through a wireless connection, and/or through a variety of other coupling methods known in the art. The method 500 then proceeds to block 504 where a tactile feedback signal is generated and transmitted to the tactile feedback input device 400. In an embodiment, the IHS 100 generates a tactile feedback signal and sends it to the controllers 404 and 406 of the tactile feedback input device 400. The method 500 then proceeds to block 506 where a mass (e.g., the masses 316 in the tactile feedback modules 300a and 300b) in the tactile feedback input device 400 is moved to produce a force on the tactile feedback input device 400. In an embodiment, the controllers 404 and 406 may use power from the power unit 402 along with the tactile feedback signal from the IHS 100 to move the masses 316 in the tactile feedback devices 300a and 300b in order to produce a force on the tactile feedback input device 400. In an embodiment, the actuators 314 and 320 are electromagnets and the tactile feedback input device 400 is coupled to the IHS 100 through a USB port that may not provide appropriate power to efficiently utilize the electromagnet actuators 404 and 406. The controllers 404 and 406 and power unit 402 may then include, for example, a capacitive charge pump that feeds into a current amplifier in order to efficiently power the electromagnet actuators 404 and 406.

Referring now to FIGS. 4 and 5b, in an embodiment of block 504 and 506 of the method 500, the tactile feedback signal from the IHS 100 may be sent to the controllers 404 and 406 in order to move both of the masses 316 in the tactile feedback modules 300a and 300b in a direction A. For example, if the actuators 314 and 320 in the tactile feedback modules 300a and 300b are electromagnets, the controllers 404 and 406 may supply power to the electromagnet actuators 314 and/or 320 in the tactile feedback modules 300a and 300b. Power may be supplied to the electromagnet actuators 314 and/or 320 in a manner that may cause the permanent magnets 324 to be attracted to the electromagnet actuators 314 and/or the permanent magnets 326 to be repelled by the electromagnet actuators 320, moving the masses 316 along the axes 312a and 312b, respectively, in the direction A from, for example, the positions illustrated in FIG. 4 to the positions illustrated in FIG. 5b, and resulting in a generally linear force on the tactile feedback input device 400 due to the movement of the masses 316 in the same direction. The linear force on the tactile feedback input device 400 may be interpreted by a user of the tactile feedback input device 400 as a linear force from the tactile feedback input device 400 along an axis.

Referring now to FIGS. 4, 5b and 5c, in an embodiment of block 504 and 506 of the method 500, the tactile feedback signal from the IHS 100 may be sent to the controllers 404 and 406 in order to move both of the masses 316 in the tactile feedback modules 300a and 300b in a direction B. For example, if the actuators 314 and 320 in the tactile feedback modules 300a and 300b are electromagnets, the controllers 404 and 406 may supply power to the electromagnet actuators 314 and/or 320 in the tactile feedback modules 300a and 300b. Power may be supplied to the electromagnet actuators 314 and/or 320 in a manner that may cause the permanent magnets 326 to be attracted to the electromagnet actuators 320 and/or the permanent magnets 324 to be repelled by the electromagnet actuators 314, moving the masses 316 along the axes 312a and 312b, respectively, in the direction B from, for example, the positions illustrated in either FIG. 4 or FIG. 5b to the positions illustrated in FIG. 5c, and resulting in a generally linear force on the tactile feedback input device 400 due to the movement of the masses 316 in the same direction. The linear force on the tactile feedback input device 400 may be interpreted by a user of the tactile feedback input device 400 as a linear force from the tactile feedback input device 400 along an axis.

Referring now to FIGS. 4 and 5d, in an embodiment of block 504 and 506 of the method 500, the tactile feedback signal from the IHS 100 may be sent to the controllers 404 and 406 in order to move the mass 316 in the tactile feedback module 300a in a direction C and to move the mass 316 in the tactile feedback module 300b in a direction D. For example, if the actuators 314 and 320 in the tactile feedback modules 300a and 300b are electromagnets, the controller 404 may supply power to the electromagnet actuators 314 and/or 320 in the tactile feedback modules 300a and 300b. Power may be supplied to the electromagnet actuators 314 and/or 320 in a manner that may cause the permanent magnet 326 in the tactile feedback module 300a to be attracted to the electromagnet actuator 320 in the tactile feedback module 300a and/or the permanent magnet 324 in the tactile feedback module 300a to be repelled by the electromagnet actuator 314, moving the mass 316 along the axis 312a in the direction C from, for example, the position illustrated in FIG. 4 to the position illustrated in FIG. 5d. Power may also be supplied to the electromagnet actuators 314 and/or 320 in a manner that may cause the permanent magnet 324 in the tactile feedback module 300b to be attracted to the electromagnet actuator 314 in the tactile feedback module 300b and/or the permanent magnet 326 in the tactile feedback module 300b to be repelled by the electromagnet actuator 320 in the tactile feedback module 300b, moving the mass 316 along the axis 312b in the direction D from, for example, the position illustrated in FIG.

4 to the position illustrated in FIG. 5d. The movement of the masses 316 in the tactile feedback modules 300a and 300b in opposite directions results in a generally rotational force on the tactile feedback input device 400. The rotational force on the tactile feedback input device 400 may be interpreted by a user of the tactile feedback input device 400 as a rotational force from the tactile feedback input device 400 about an axis.

Referring now to FIGS. 4 and 5e, in an embodiment of block 504 and 506 of the method 500, the tactile feedback signal from the IHS 100 may be sent to the controllers 404 and 406 in order to move the mass 316 in the tactile feedback module 300a in a direction E and to move the mass 316 in the tactile feedback module 300b in a direction F. For example, if the actuators 314 and 320 in the tactile feedback modules 300a and 300b are electromagnets, the controller 404 may supply power to the electromagnet actuators 314 and/or 320 in the tactile feedback modules 300a and 300b. Power may be supplied to the electromagnet actuators 314 and/or 320 in a manner that may cause the permanent magnet 324 in the tactile feedback module 300a to be attracted to the electromagnet actuator 314 in the tactile feedback module 300a and/or the permanent magnet 326 in the tactile feedback module 300a to be repelled by the electromagnet actuator 320 in the tactile feedback module 300a, moving the mass 316 along the axis 312a in the direction E from, for example, the position illustrated in FIG. 4 to the position illustrated in FIG. 5e. Power may also be supplied to the electromagnet actuators 314 and/or 320 in a manner that may cause the permanent magnet 326 in the tactile feedback module 300b to be attracted to the electromagnet actuator 320 in the tactile feedback module 300b and/or the permanent magnet 324 in the tactile feedback module 300b to be repelled by the electromagnet actuator 314 in the tactile feedback module 300b, moving the mass 316 along the axis 312b in the direction F from, for example, the position illustrated in FIG. 4 to the position illustrated in FIG. 5e. The movement of the masses 316 in the tactile feedback modules 300a and 300b in opposite directions results in a generally rotational force on the tactile feedback input device 400. The rotational force on the tactile feedback input device 400 may be interpreted by a user of the tactile feedback input device 400 as a rotational force from the tactile feedback input device 400 about an axis.

Figure 6A:
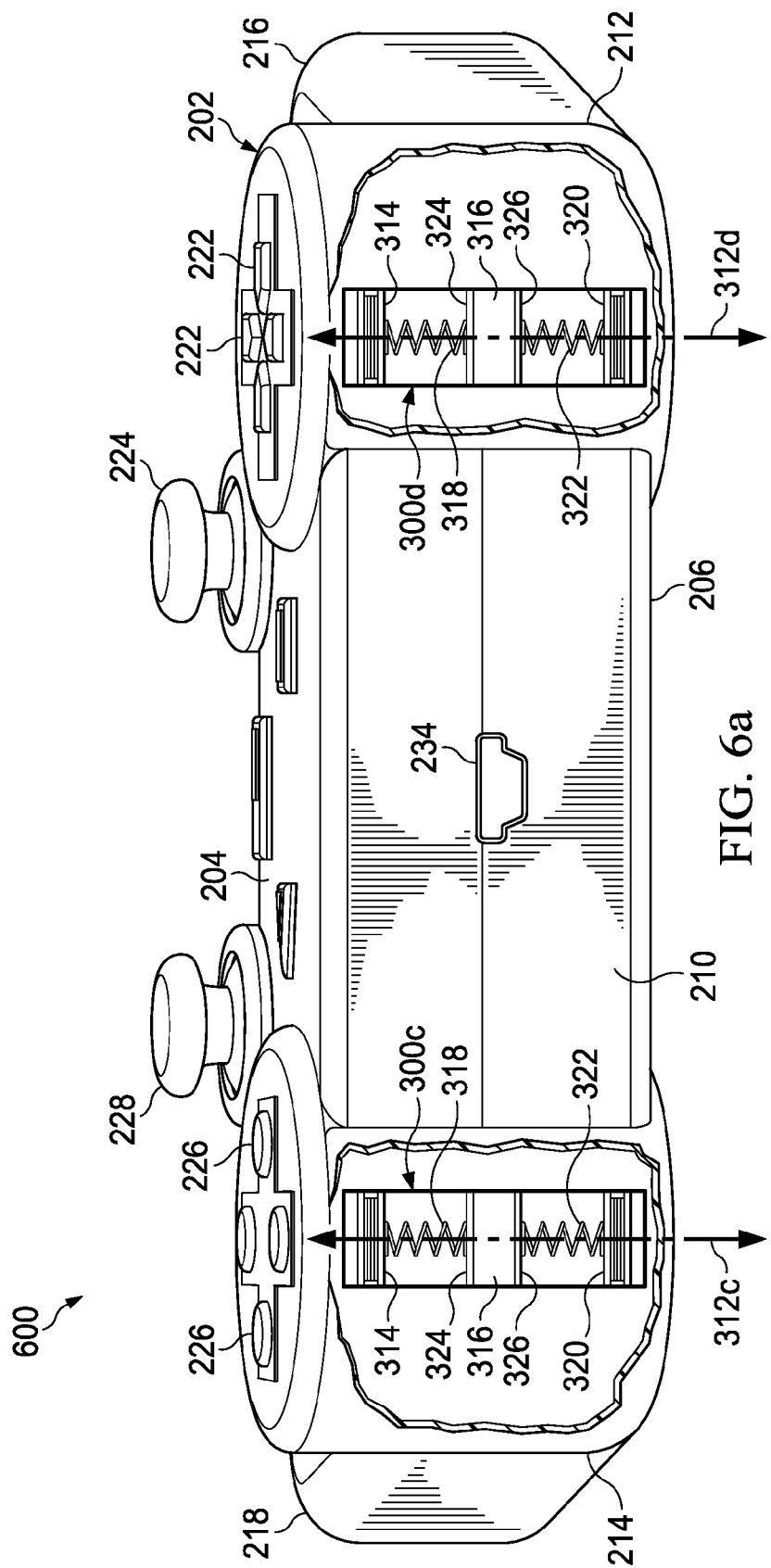
FIG. 6a is a cut away rear view illustrating an embodiment of a tactile feedback input device including the input device chassis of FIGS. 2a, 2b and 2c, and a plurality of the tactile feedback modules of FIGS. 3a and 3b.

Referring now to FIGS. 2b, 3b and 6a, an embodiment of a tactile feedback input device 600 is illustrated. In an embodiment, the tactile feedback input device 600 may be the input device 106 coupled to the IHS 100, described above with reference to FIG. 1. In an embodiment, the tactile feedback input device 600 may be combined with the tactile feedback input device 400, described above with reference to FIGS. 4, 5a, 5b, 5c, 5d and 5e. In the illustrated embodiment, a plurality of tactile feedback modules 300c and 300d, which are substantially similar in structure and operation to the tactile feedback module 300, described above with reference to FIGS. 3a and 3b, are located in the input device chassis housing 220 with the tactile feedback module 300c located adjacent the rear surface 210 and the side surface 214 of the input device chassis 202 and the tactile feedback module 300d located adjacent the rear surface 210 and the side surface 212 of the input device chassis 202. The tactile feedback module 300c includes an axis 312c that is substantially similar to the axis 312 described above with reference to FIGS. 3a and 3b, and the tactile feedback module 300d includes an axis 312d that is substantially similar to the axis 312 described above with reference to FIGS. 3a and 3b. In the illustrated embodiment, the axis 312c of the tactile feedback module 300c is parallel to the axis 312d of the tactile feedback module 300d. In an embodiment, the tactile feedback input devices 600 and 400 are combined, and the parallel axes 312c and 312d of the tactile feedback modules 300c and 300d, are perpendicular to the parallel axis 312a and 312b of the tactile feedback modules 300a and 300b. In an embodiment, the tactile feedback modules 300c and 300d include power units and controllers that are substantially similar to the power unit 402 and the controllers 404 and 406, described above with reference to FIGS. 4, 5a, 5b, 5c, 5d and 5e. In an embodiment, the tactile feedback input modules 600 may operate according to the method 500 in substantially the same manner as described above for the tactile feedback input device 400, as described in further detail below.

Figure 6B:
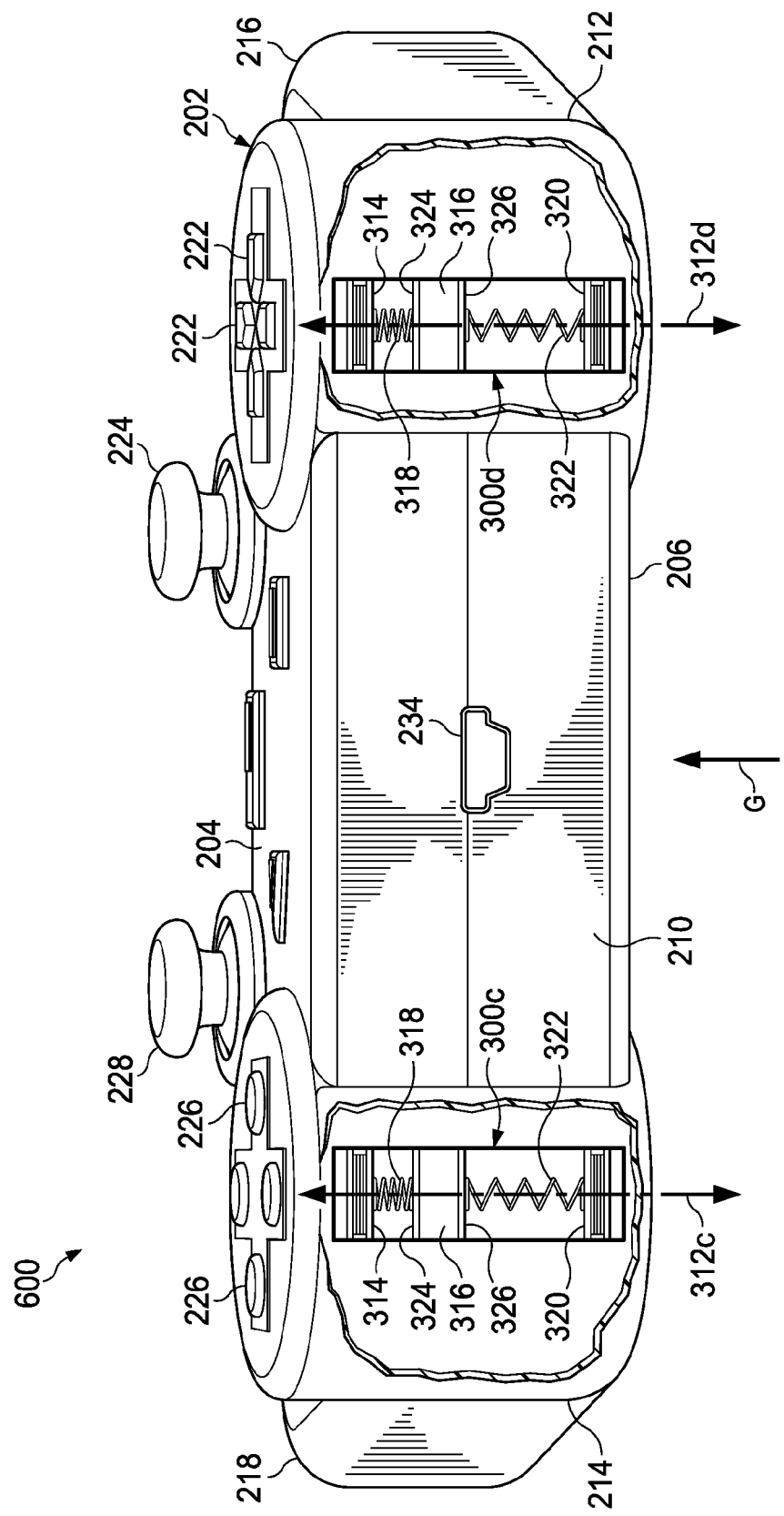
FIG. 6b is a cut away rear view illustrating an embodiment of the tactile feedback input device of FIG. 4 with a plurality of the tactile feedback modules of FIGS. 3a and 3b being operated to produce a force on the tactile feedback input device.

Referring now to FIGS. 6a and 6b, in an embodiment of block 504 and 506 of the method 500, the tactile feedback signal from the IHS 100 may be sent to controllers, similar to the controllers 404 and 406, in order to move both of the masses 316 in the tactile feedback modules 300c and 300d in a direction G. For example, if the actuators 314 and 320 in the tactile feedback modules 300c and 300d are electromagnets, power may be supplied to the electromagnet actuators 314 and/or 320 in the tactile feedback modules 300c and 300d. Power may be supplied to the electromagnet actuators 314 and/or 320 in a manner that may cause the permanent magnets 324 to be attracted to the electromagnet actuators 314 and/or the permanent magnets 326 to be repelled by the electromagnet actuators 320, moving the masses 316 along the axes 312c and 312d, respectively, in the direction G from, for example, the positions illustrated in FIG. 6a to the positions illustrated in FIG. 6b, and resulting in a generally linear force on the tactile feedback input device 600 due to the movement of the masses 316 in the same direction. The linear force on the tactile feedback input device 600 may be interpreted by a user of the tactile feedback input device 600 as a linear force from the tactile feedback input device 600 along an axis.

Figure 6C:
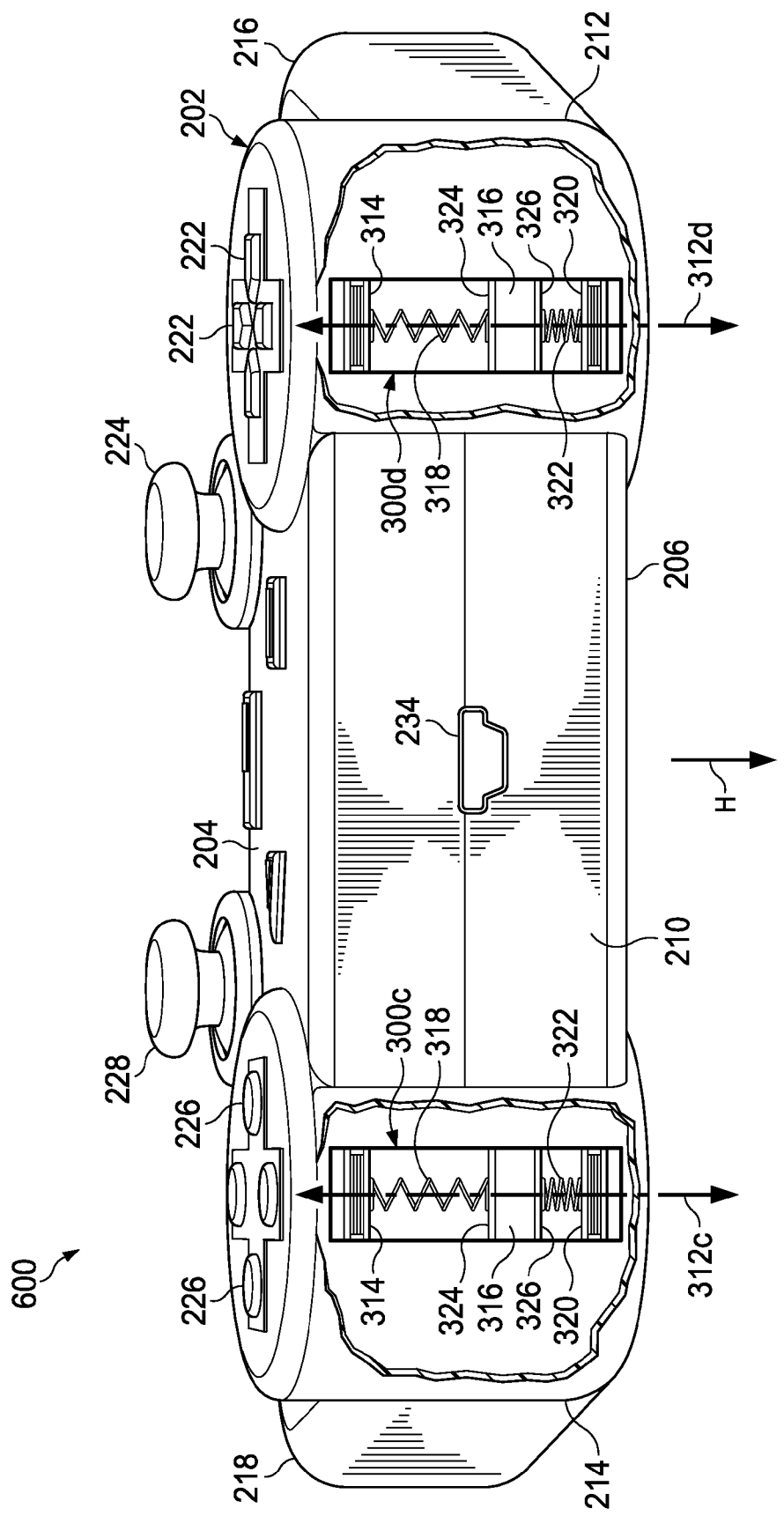
FIG. 6c is a cut away rear view illustrating an embodiment of the tactile feedback input device of FIG. 4 with a plurality of the tactile feedback modules of FIGS. 3a and 3b being operated to produce a force on the tactile feedback input device.

Referring now to FIGS. 6a, 6b and 6c, in an embodiment of block 504 and 506 of the method 500, the tactile feedback signal from the IHS 100 may be sent to controllers, similar to the controllers 404 and 406, in order to move both of the masses 316 in the tactile feedback modules 300c and 300d in a direction H. For example, if the actuators 314 and 320 in the tactile feedback modules 300c and 300d are electromagnets, power may be supplied to the electromagnet actuators 320 in the tactile feedback modules 300c and 300d. Power may be supplied to the electromagnet actuators 314 and/or 320 in a manner that may cause the permanent magnets 326 to be attracted to the electromagnet actuators 320 and/or the permanent magnets 324 to be repelled by the electromagnet actuators 314, moving the masses 316 along the axes 312c and 312c, respectively, in the direction H from, for example, the positions illustrated in either FIG. 6a or FIG. 6b to the positions illustrated in FIG. 6c, and resulting in a generally linear force on the tactile feedback input device 600 due to the movement of the masses 316 in the same direction. The linear force on the tactile feedback input device 600 may be interpreted by a user of the tactile feedback input device 600 as a linear force from the tactile feedback input device 600 along an axis.

Figure 6D:
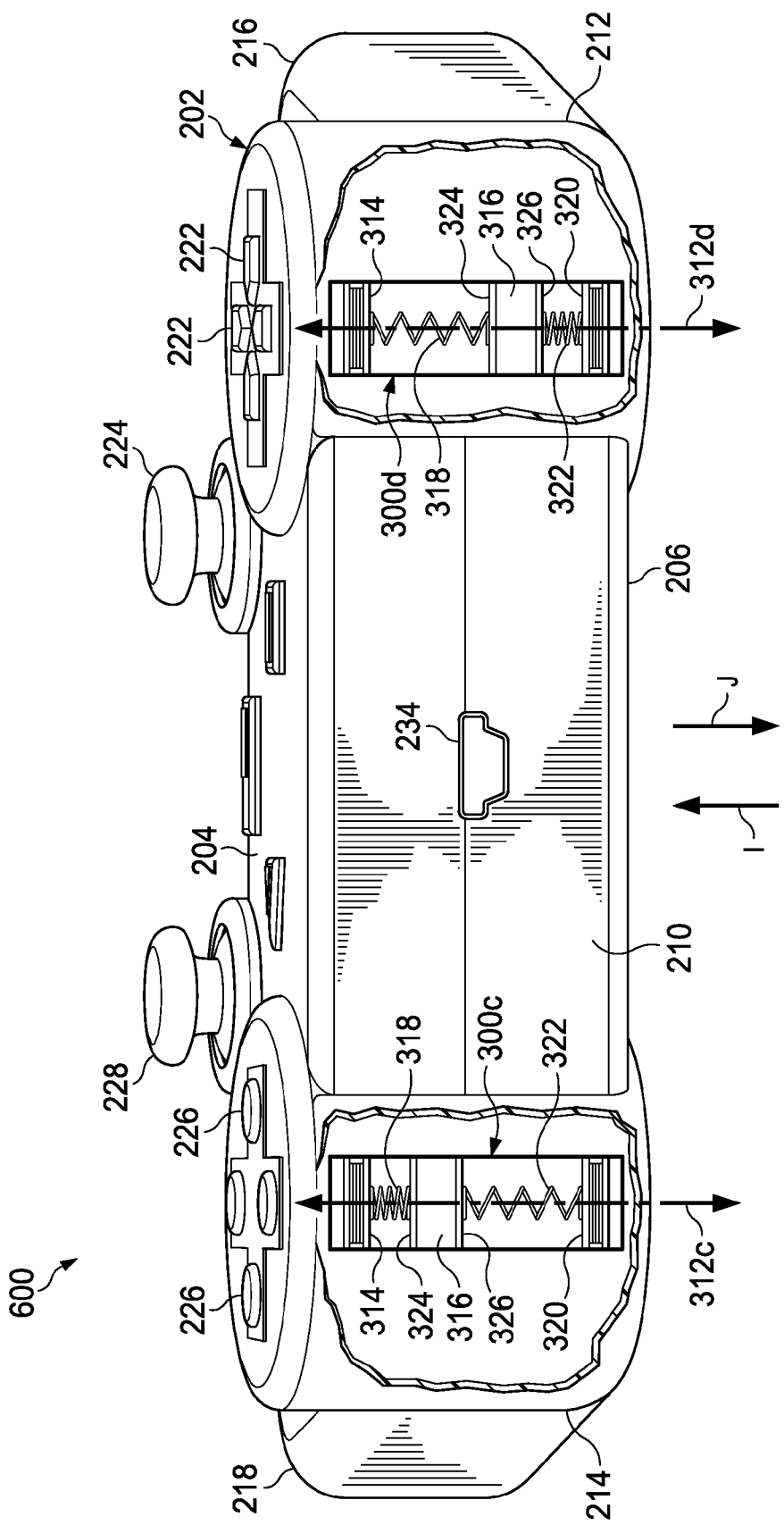
FIG. 6d is a cut away rear view illustrating an embodiment of the tactile feedback input device of FIG. 4 with a plurality of the tactile feedback modules of FIGS. 3a and 3b being operated to produce a force on the tactile feedback input device.

Referring now to FIGS. 6 and 6d, in an embodiment of block 504 and 506 of the method 500, the tactile feedback signal from the IHS 100 may be sent to controllers, similar to the controllers 404 and 406, in order to move the mass 316 in the tactile feedback module 300c in a direction I and to move the mass 316 in the tactile feedback module 300d in a direction J. For example, if the actuators 314 and 320 in the tactile feedback modules 300c and 300d are electromagnets, power may be supplied to the electromagnet actuators 314 and/or 320 in the tactile feedback module 300c in a manner that may cause the permanent magnet 324 in the tactile feedback module 300c to be attracted to the electromagnet actuator 314 in the tactile feedback module 300c and/or the permanent magnet 326 in the tactile feedback module 300c to be repelled by the electromagnet actuator 320 in the tactile feedback module 300c, moving the mass 316 along the axis 312c in the direction I from, for example, the position illustrated in FIG. 6a to the position illustrated in FIG. 6d. Power may also be supplied to the electromagnet actuators 314 and/or 320 in the tactile feedback module 300d in a manner that may cause the permanent magnet 326 in the tactile feedback module 300d to be attracted to the electromagnet actuator 320 in the tactile feedback module 300d and/or the permanent magnet 324 in the tactile feedback module 300d to be repelled by the electromagnet actuator 314, moving the mass 316 along the axis 312d in the direction J from, for example, the positions illustrated in FIG. 6a to the positions illustrated in FIG. 6d. The movement of the masses 316 in the tactile feedback modules 300c and 300d in opposite directions results in a generally rotational force on the tactile feedback input device 600. The rotational force on the tactile feedback input device 600 may be interpreted by a user of the tactile feedback input device 600 as a rotational force from the tactile feedback input device 600 about an axis.

Figure 6E:
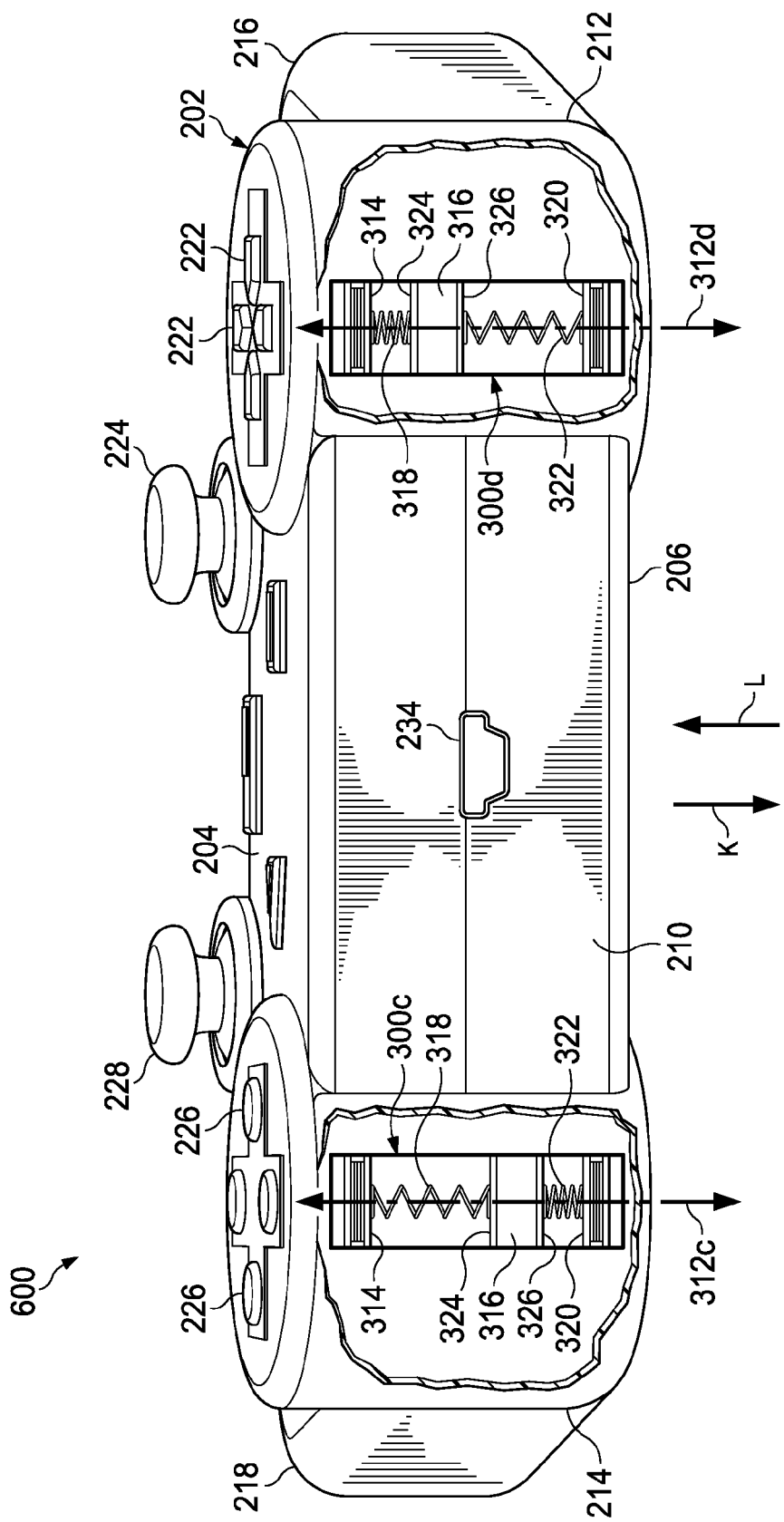
FIG. 6e is a cut away rear view illustrating an embodiment of the tactile feedback input device of FIG. 4 with a plurality of the tactile feedback modules of FIGS. 3a and 3b being operated to produce a force on the tactile feedback input device.

Referring now to FIGS. 6a and 6e, in an embodiment of block 504 and 506 of the method 500, the tactile feedback signal from the IHS 100 may be sent to controllers, similar to the controllers 404 and 406, in order to move the mass 316 in the tactile feedback module 300c in a direction K and to move the mass 316 in the tactile feedback module 300d in a direction L. For example, if the actuators 314 and 320 in the tactile feedback modules 300a and 300b are electromagnets, power may be supplied to the electromagnet actuators 314 and/or 320 in the tactile feedback module 300c in a manner that may cause the permanent magnet 326 in the tactile feedback module 300c to be attracted to the electromagnet actuator 320 in the tactile feedback module 300c and/or the permanent magnet 324 in the tactile feedback module 300c to be repelled by the electromagnet actuator 314 in the tactile feedback module 300c, moving the mass 316 along the axis 312c in the direction K from, for example, the position illustrated in FIG. 6a to the position illustrated in FIG. 6e. Power may also be supplied to the electromagnet actuators 314 and/or 320 in the tactile feedback module 300d in a manner that may cause the permanent magnet 324 in the tactile feedback module 300d to be attracted to the electromagnet actuator 314 in the tactile feedback module 300d and/or the permanent magnet 326 in the tactile feedback module 300d to be repelled by the electromagnet actuator 320, moving the mass 316 along the axis 312d in the direction L from, for example, the position illustrated in FIG. 6a to the position illustrated in FIG. 6e. The movement of the masses 316 in the tactile feedback modules 300c and 300d in opposite directions results in a generally rotational force on the tactile feedback input device 600. The rotational force on the tactile feedback input device 600 may be interpreted by a user of the tactile feedback input device 600 as a rotational force from the tactile feedback input device 600 about an axis.

Thus, a tactile feedback input device has been described that may provide multi-axis forces (e.g., linear and rotational forces) along and about the axes of the tactile feedback input device. One of skill in the art will recognize a variety of other forces that may be created using the tactile feedback input device described above without departing from the scope of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An input device, comprising:
    an input device chassis;
    a plurality of tactile feedback modules coupled to the input device chassis, each of the plurality of tactile feedback modules comprising:
        a first electromagnet and a second electromagnet located in a spaced apart relationship from the first electromagnet; and
        a mass comprising a pair of opposing ends and located between the first electromagnet and the second electromagnet, wherein a permanent magnet is located on each of the opposing ends of the mass, and wherein the mass is operable to move along an axis between the first electromagnet and the second electromagnet; and
    at least one controller that is coupled to the plurality of tactile feedback modules and that is operable to receive a tactile feedback signal and, in response, actuate each mass in the plurality of tactile feedback modules to move each mass along the axis in a single direction and then stop movement of each mass for a period of time, wherein the movement of each mass is synchronized and the period of time that the masses are stopped is selected to produce one of a single linear force and a single rotational force on the input device chassis.

2. The input device of claim 1, wherein each of the plurality of tactile feedback modules further comprise:
    a power storage device coupled to the first electromagnet and the second electromagnet.

3. The input device of claim 1, wherein the plurality of tactile feedback modules comprise a first tactile feedback module and a second tactile feedback module each coupled to the input device chassis such that the first tactile feedback module is located in a spaced apart relationship from the second tactile feedback module.

4. The input device of claim 3, wherein the mass of the first tactile feedback module is operable to move along a first axis and the mass of the second tactile feedback module is operable to move along a second axis, and wherein the first axis is parallel to the second axis.

5. The input device of claim 3, wherein the mass of the first tactile feedback module is operable to move along a first axis and the mass of the second tactile feedback module is operable to move along a second axis, and wherein the first axis is perpendicular to the second axis.

6. The input device of claim 3, wherein the plurality of tactile feedback modules comprise a third tactile feedback module and a fourth tactile feedback module each coupled to the input device chassis, and wherein the mass of the third tactile feedback module is operable to move along a third axis and the mass of the fourth tactile feedback module is operable to move along a fourth axis, and wherein the third axis is parallel to the fourth axis and the first and second axes are perpendicular to the third and fourth axes.

7. The input device of claim 1, wherein each of the plurality of tactile feedback modules comprise a feedback module chassis that houses the first and second electromagnets and the mass.

8. The input device of claim 1, wherein each of the plurality of tactile feedback modules further comprise:

a first resilient member extending between the first electromagnet and the mass and a second resilient member extending between the second electromagnet and the mass.

9. An information handling system (IHS), comprising:
an IHS chassis;
a processor located in the IHS chassis; and
an input device operable to be coupled to the processor in the IHS, the input device comprising:
an input device chassis; and
a plurality of tactile feedback modules that are located on the input device chassis and operable to be coupled to the processor, the plurality of tactile feedback modules comprising:
a first actuator and a second actuator located in a spaced apart relationship from the first actuator; and
a mass located between the first actuator and the second actuator, wherein the first and second actuators are operable to move the mass along an axis between the first actuator and the second actuator; and
at least one controller that is coupled to the plurality of tactile feedback modules and that is operable to receive a tactile feedback signal from the processor and, in response, actuate each mass in the plurality of tactile feedback modules in a single direction along the axis from a first stopped position to a second stopped position, wherein the movement of each mass is synchronized and provided such that a user will interpret one of a single linear force and a single-rotational force on the input device chassis in response to the synchronized movement of the masses.

10. The IHS of claim 9, wherein each of the plurality of tactile feedback modules further comprise:
a power storage device operable to be coupled between the processor and the first and second actuators.

11. The IHS of claim 9, wherein the plurality of tactile feedback modules comprise a first tactile feedback module and a second tactile feedback module each coupled to the input device chassis such that the first tactile feedback module is located in a spaced apart relationship from the second tactile feedback module.

12. The IHS of claim 11, wherein the mass of the first tactile feedback module is operable to move along a first axis and the mass of the second tactile feedback module is operable to move along a second axis, and wherein the first axis is parallel to the second axis.

13. The IHS of claim 11, wherein the mass of the first tactile feedback module is operable to move along a first axis and the mass of the second tactile feedback module is operable to move along a second axis, and wherein the first axis is perpendicular to the second axis.

14. The IHS of claim 11, wherein the plurality of tactile feedback modules comprise a third tactile feedback module and a fourth tactile feedback module each coupled to the input device chassis, and wherein the mass of the third tactile feedback module is operable to move along a third axis and the mass of the fourth tactile feedback module is operable to move along a fourth axis, and wherein the third axis is parallel to the fourth axis and the first and second axes are perpendicular to the third and fourth axes.

15. The IHS of claim 9, wherein each of the plurality of tactile feedback modules comprise a feedback module chassis that houses the first and second actuators and the mass.

16. The IHS of claim 9, wherein each of the plurality of tactile feedback modules further comprise:
a first resilient member extending between the first actuator and the mass and a second resilient member extending between the second actuator and the mass.

17. A method for providing tactile feedback for an input device, comprising:
providing an input device coupled to an information handling system, wherein the input device comprises a plurality of tactile feedback modules located in a spaced apart orientation on the input device, and wherein each tactile feedback module comprises a mass linearly moveable along an axis;
generating a tactile feedback signal from the information handling system and transmitting the tactile feedback signal to the plurality of tactile feedback modules; and
moving each mass in the plurality of tactile feedback modules along the axis in a single direction and then stopping each mass for a period of time in response to the tactile feedback signal, wherein the movement of the masses is synchronized and the period of time that the masses are stopped is selected such that a user will interpret the movement of the masses as one of a single linear force and a single rotational force on the input device.

18. The method of claim 17, wherein the providing an input device comprising a plurality of tactile feedback modules includes providing a first tactile feedback module having a first mass linearly moveable along a first axis and a second tactile feedback module having a second mass linearly moveable along a second axis that is parallel to the first axis, and wherein the moving the mass in at least one tactile feedback module comprises moving the first mass in a first direction along the first axis and moving the second mass in the first direction along the second axis.

19. The method of claim 17, wherein the providing an input device comprising a plurality of tactile feedback modules includes providing a first tactile feedback module having a first mass linearly moveable along a first axis and a second tactile feedback module having a second mass linearly moveable along a second axis that is parallel to the first axis, and wherein the moving the mass in at least one tactile feedback module comprises moving the first mass in a first direction along the first axis and moving the second mass in a second direction along the second axis that is opposite the first direction.

20. The method of claim 17, further comprising:
storing power for use in moving each mass in the plurality of tactile feedback modules.

21. The input device of claim 1 wherein each of the plurality of tactile feedback modules further comprises:
a capacitive charge pump that feeds into a current amplifier coupled to each of the first electromagnet and the second electromagnet.

22. The IHS of claim 9, wherein each of the plurality of tactile feedback modules further comprises:
a capacitive charge pump that feeds into a current amplifier coupled to the first actuator and the second actuator.

23. The method of claim 17 wherein each of the plurality of tactile feedback modules further comprises:
a first actuator and a second actuator; and
a capacitive charge pump that feeds into a current amplifier coupled to the first actuator and the second actuator.

* * * * *